(12) United States Patent
Sakai et al.

(10) Patent No.: US 7,314,427 B2
(45) Date of Patent: Jan. 1, 2008

(54) DRIVING FORCE TRANSMISSION APPARATUS

(75) Inventors: Toshiya Sakai, Zama (JP); Ryutaro Kunimasa, Hadano (JP)

(73) Assignee: Nissan Motor Co., Ltd., Yokohama (JP)

( * ) Notice: Subject to any disclaimer, the term of this patent is extended or adjusted under 35 U.S.C. 154(b) by 299 days.

(21) Appl. No.: 11/179,805

(22) Filed: Jul. 13, 2005

(65) Prior Publication Data

US 2006/0011004 A1 Jan. 19, 2006

(30) Foreign Application Priority Data

Jul. 16, 2004 (JP) ............... 2004-210325

(51) Int. Cl.
*F16H 61/00* (2006.01)
*F16H 3/38* (2006.01)
*B60W 10/02* (2006.01)

(52) U.S. Cl. ............ 477/116; 477/175; 74/340

(58) Field of Classification Search .......... 477/174, 477/175, 180, 115, 116; 74/329, 330, 335, 74/340

See application file for complete search history.

(56) References Cited

U.S. PATENT DOCUMENTS

| | | | |
|---|---|---|---|
| 4,517,859 A | | 5/1985 | Nagaoka et al. |
| 5,002,170 A | * | 3/1991 | Parsons et al. ............ 477/86 |
| 5,915,512 A | * | 6/1999 | Adamis et al. ............ 192/3.61 |
| 6,675,668 B2 | * | 1/2004 | Schamscha ................. 74/340 |
| 6,755,089 B2 | * | 6/2004 | Hirt ............................. 74/329 |
| 6,790,159 B1 | * | 9/2004 | Buchanan et al. ............ 477/86 |
| 6,832,978 B2 | * | 12/2004 | Buchanan et al. .......... 477/174 |
| 6,978,691 B2 | * | 12/2005 | Katakura ..................... 74/331 |
| 2002/0183162 A1 | | 12/2002 | Ogawa et al. |

FOREIGN PATENT DOCUMENTS

| | | |
|---|---|---|
| DE | 19751456 A1 | 5/1999 |
| DE | 10119509 A1 | 10/2002 |
| DE | 10232837 A1 | 2/2004 |
| JP | 8-320054 A | 12/1996 |
| JP | 09196164 A | 7/1997 |

* cited by examiner

*Primary Examiner*—Roger Pang
(74) *Attorney, Agent, or Firm*—Global IP Counselors, LLP

(57) ABSTRACT

A driving force transmission apparatus is provided for a twin clutch transmission with two clutches, that are controlled a gear change control without a torque cutting out to reduce slapping sounds of the gears by performing a pre-shift operation before the gear shift control. For instance, in an up-shift operation from second speed to third speed, the clutch that transmits torque to the third speed gear set is slip-engaged and one gear of the third speed gear set is connected through a synchronous engagement device to a countershaft. During the pre-shift, a sub torque transmission path that is formed transmits engine torque of the engine, a crankshaft, the clutch, a first input shaft, the third speed gear set, the countershaft, and a differential gear system, preventing the first input shaft from becoming idle and the slapping sound of the gears in an engagement part of the third speed gear set.

12 Claims, 9 Drawing Sheets

DRIVING FORCE TRANSMISSION APPARATUS

CROSS-REFERENCE TO RELATED APPLICATIONS

This application claims priority under 35 U.S.C. § 119 to Japanese Patent Application No. 2004-210325. The entire disclosure of Japanese Patent Application No. 2004-210325 is hereby incorporated herein by reference.

BACKGROUND OF THE INVENTION

1. Field of the Invention

The present invention generally relates to a drive force transmission apparatus. More specifically, the present invention relates to a manual transmission capable of an automatic transmission control, noises called gear slapping sounds caused by collisions of gears defining a gear set in a set shift range at an engagement part thereof are reduced.

2. Background Information

Some conventional transmissions are provided with two drive transmission paths using a pair of discrete clutches that selectively input an engine rotation into the drive transmission paths. One example of this type of conventional transmission is described in Japanese Unexamined Patent Publication No. 8-320054. This transmission is a manual transmission, but at the same time, can control the automatic transmission control. More specifically, such transmissions are provided with a pair of input shafts with one in each of the respective transmission paths that are selectively engaged by the operation of the clutches during a gearshift operation. Thus, a gearshift operation can be perform by a switching gear shift in which one of the clutches connected to one the input shafts is engaged and the other is disengaged. During this gearshift operation, the clutches are operated so that torque is being constantly transmitted from the engine to the differential gear system. Thus, one feature of the gearshift control for this type of twin clutch transmission is that a so-called torque cutting phenomenon does not occur. The so-called torque cutting phenomenon is where torque transmission from an engine becomes "0" during the gearshift operation.

The so-called torque cutting phenomenon occurs in typical clutch transmissions that are provided with one clutch and one input shaft. In other words, in the gearshift operation for the typical clutch transmission provided with a single clutch and a single input shaft having a plurality of gear sets attached between the input shaft and a countershaft, during a first time period, the clutch is disengaged such that the torque transmission from the engine is completely cut off. Then, the current gear shift range or ratio is disconnected during the first time period, and another gear set is selected for a target gear shift range or ratio. Finally, the clutch is re-engaged during a second time period to complete the gear shift operation. Therefore, the torque transmission from the engine becomes "0" during the period of time during the second time period.

In view of the above, it will be apparent to those skilled in the art from this disclosure that there exists a need for an improved drive force transmission apparatus. This invention addresses this need in the art as well as other needs, which will become apparent to those skilled in the art from this disclosure.

SUMMARY OF THE INVENTION

However, it has been discovered that in conventional twin clutch transmissions such as the one described above, a problem with a slapping sound of gears (it is also called a rattle phenomenon) arises, that is, a noise is generated by collisions of gears at an engagement part of the gears belonging to a gear set of a gear shift range.

The present invention was contrived in view of the foregoing problem. One object of the present invention is to provide a driving force transmission apparatus that can reduce the slapping sound of the gears generated at the time of a switching gear shift operation. The driving force transmission apparatus of the present invention is based upon recognition that the slapping sound of the gears is not generated in a gear set defining a part of a torque transmission path leading from an engine to a differential gear system In order to achieve the above mentioned objects and other objects of the present invention, a driving force transmission apparatus is provided that basically comprises a first input shaft, a second input shaft, a first clutch, a second clutch, a countershaft, a gear engagement device and a transmission control unit. The first input shaft has a plurality of first gears. The second input shaft has a plurality of second gears. The first clutch is configured and arranged to operatively transmit an engine driving force of an engine to the first input shaft. The second clutch is configured and arranged to operatively transmit the engine driving force of the engine to the second input shaft. The countershaft has a plurality of third gears with the countershaft being disposed in parallel with the first and second input shafts such that the third gears are engaged with the first and second gears to selectively transmit the engine driving force from the first and second input shafts to the countershaft through first and second gear sets. The first gear sets are established by connection of one of the first and third gears together. The second gear sets are established by connection of one of the second and third gears together. One of the first, second and third gears in each of the first and second gear sets is rotatably mounted on a corresponding one of the first and second input shafts and the countershaft. One of the first, second and third gears in each of the first and second gear sets is non-rotatably mounted on a corresponding one of the first and second input shafts and the countershaft. The gear engagement device is configured and arranged to selectively fix of one of the first, second and third gears that are rotatably mounted to the corresponding one of the first and second input shafts and the countershaft. The transmission control unit is configured to selectively operate the first and second clutches and the gear engagement device when a predetermined engine operating condition is determined to selectively establish one of a first drive transmission path transmitting the engine driving force from the first clutch via the first input shaft through one of the first gear sets and the countershaft to a driving wheel, and a second drive transmission path transmitting the engine driving force from the second clutch via the second input shaft through the one of the second gear sets and the countershaft to the driving. The transmission control unit is further configured to performed a gear shift operation that switches from a current drive transmission path of one of the first and second drive transmission paths to a next drive transmission path of one of the first and second drive transmission paths such that one of each of the first and second gear sets are both engaged for a period of time prior to the gear shift operation with a slip engagement occurring in the one of the first and second clutches that is disposed in the next drive transmission path during the period of time in which one of each of the first and second gear sets are engaged.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
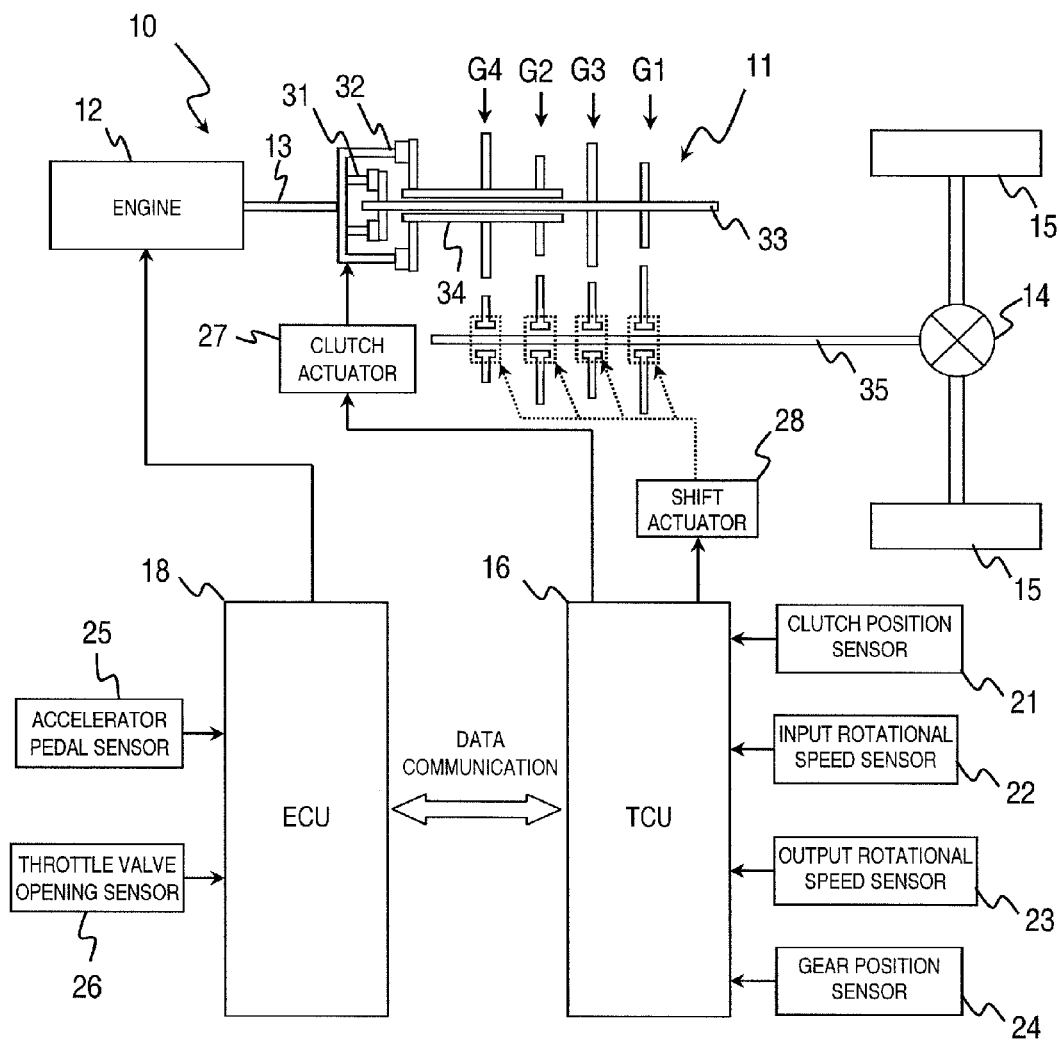
FIG. 1 is a simplified schematic view of a vehicle equipped with a twin clutch transmission, an engine control system and a transmission control system that form a driving force transmission apparatus in accordance with a preferred embodiment of the present invention.

Referring initially to FIG. 1, a vehicle 10 with a twin clutch transmission 11 is schematically illustrated in accordance with a first embodiment. Thus, the vehicle 10 is equipped with a driving force transmission apparatus that includes the twin clutch transmission 11. As shown in FIG. 1, an input side of the twin clutch transmission 11 is operatively connected to an internal combustion engine 12 via an engine output shaft (crankshaft) 13, while an output side of the twin clutch transmission 11 is operatively connected to a differential gear system 14 which in turn is connected two a pair of driving wheels 15.

As shown in FIG. 1, the driving force transmission apparatus includes an electronic control system having a transmission control unit (TCU) 16 and an engine control unit (ECU) 18. The control units 16 and 18 are communicated with each other so as to bi-directionally transmit information. The control units 16 and 18 can be a single microcomputer with an input/output interface (I/O), storage devices such as a ROM (Read Only Memory) device and a RAM (Random Access Memory) device, and a central processing unit (CPU). Alternatively, the control units 16 and 18 can be a pair of separate microcomputers each with an input/output interface (I/O), storage devices such as a ROM (Read Only Memory) device and a RAM (Random Access Memory) device, and a central processing unit (CPU). The microcomputer of the transmission control unit 16 is programmed to control the shifting of the twin clutch transmission 11, as discussed below, while the engine control unit 18 is programmed to control the operation of the engine 12 in a conventional manner. It will be apparent to those skilled in the art from this disclosure that the precise structure and algorithms for control units 16 and 18 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

In the illustrated embodiment, a transmission control system of the driving force transmission apparatus is provided with a clutch position sensor 21, an input rotational speed sensor 22, an output rotational speed sensor 23 and a gear position sensor 24 as shown in FIG. 1. The operation of the twin clutch transmission 11 is controlled by the transmission control unit 16, based on various input signals from various sensors, such as but not limited to, the sensors 21, 22, 23 and 24. The clutch position sensor 21 is configured and arranged to detect clutch engagement status of the twin clutch transmission 11, and output a signal indicative of the clutch engagement status to the transmission control unit 16. The input rotational speed sensor 22 is configured and arranged to detect an input rotational speed of the twin clutch transmission 11 (i.e., engine rotational speed), and output a signal indicative of the input rotational speed to the transmission control unit 16. The output rotational speed sensor 23 is configured and arranged to detect an output rotational speed of the twin clutch transmission 11, and output a signal indicative of the output rotational speed to the transmission control unit 16. The gear position sensor 24 is configured and arranged to detect a current gear position corresponding to a current gear ratio, and output a signal indicative of the current gear ratio to the transmission control unit 16.

In the illustrated embodiment, an engine control system of the driving force transmission apparatus is provided an accelerator pedal sensor 25 and a throttle valve opening sensor 26 as shown in FIG. 1. The operation of the internal combustion engine 12 is controlled by the engine control unit 18, based on various input signals from various sensors, such as but not limited to, the sensors 25 and 26. The accelerator pedal sensor 25 is configured and arranged to detect an accelerator pedal depression amount, and output a signal indicative of the accelerator pedal depression amount to the engine control unit 18. The throttle valve opening sensor 26 is configured and arranged to detect an opening degree of a throttle valve, and outputs a signal indicative of the opening degree of the throttle valve to the engine control unit 18. Since the transmission control unit 16 and the engine control unit 18 communicate with each other, the information from the sensors 21 to 24 is outputted from the transmission control unit 16 to the engine control unit 18, and the information from the sensors 25 and 26 is outputted from the engine control unit 18 to the transmission control unit 16.

The transmission control unit 16 is also operatively connected to a clutch actuator 27 and a shift actuator 28 to control the twin clutch transmission 11 based on various input signals from the sensors 21 to 26, as well as other sensors, as needed and/or desired. Thus, the transmission control unit 16 and the engine control unit 18 cooperate together to control the twin clutch transmission 11 and the engine 12 such that a demanded driving torque requested by the driver is obtained, as explained below.

Figure 2:
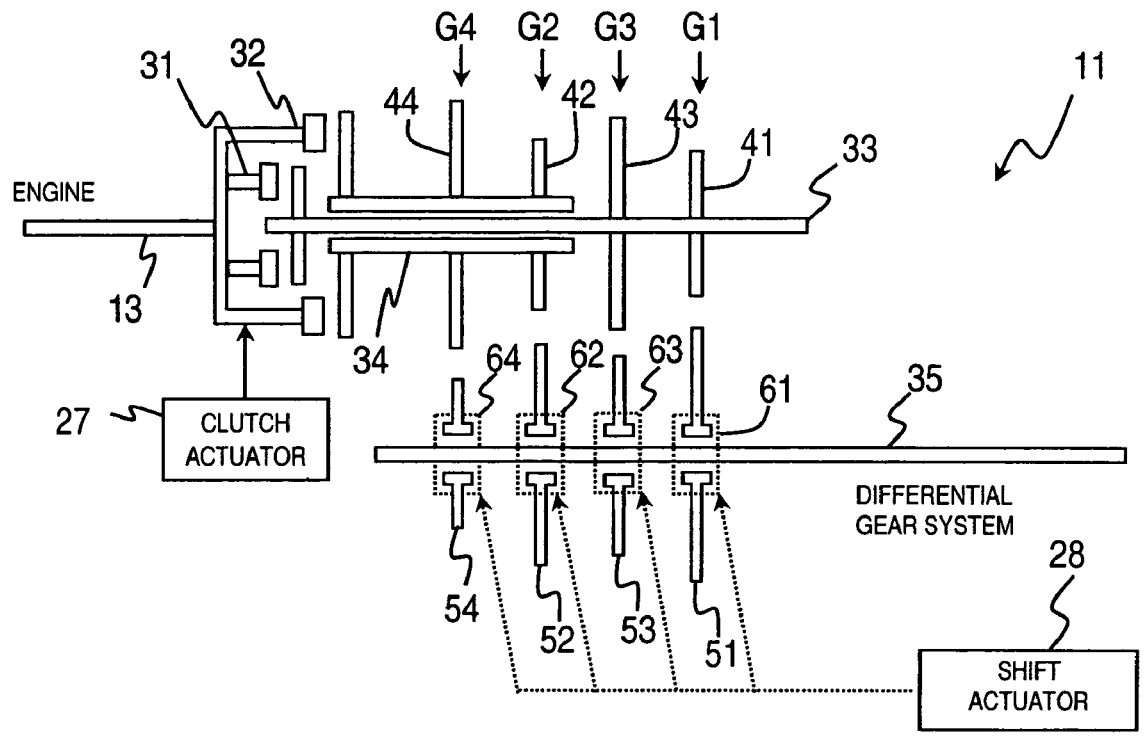
FIG. 2 is a simplified schematic view of the twin clutch transmission of the driving force transmission apparatus illustrated in accordance with the present invention.

FIG. 2 is a simplified schematic view of the twin clutch transmission 11 including a pattern of gear shift ranges with a first speed to a fourth speed. The remaining and/or additional gear shift ranges (e.g., a reverse speed, a fifth speed and a sixth speed) have been omitted in the illustration for the sake of simplicity. The twin clutch transmission 11 basically includes a first automatic clutch 31, a second automatic clutch 32, a first input shaft 33, a second input shaft 34, and an output countershaft 35. The twin clutch transmission 11 further includes a plurality of input gears 41, 42, 43 and 44, a plurality of output gears 51, 52, 53 and 54, and a plurality of synchronous gear engagement mechanisms 61, 62, 63 and 64.

The input gears 41 and 43 are fixed to the first input shaft 33 in a non-rotatable manner such the input gears 41 and 43 always rotate together with the first input shaft 33. The input gears 42 and 44 are fixed to the second input shaft 34 in a non-rotatable manner such the input gears 42 and 44 always rotate together with the second input shaft 34. The output gears 51, 52, 53 and 54 are mounted on the countershaft 35 in a rotatable manner such the output gears 51, 52, 53 and 54 can freely rotate relative to the countershaft 35. The input gears 41 and 43 can be considered first gears, while the input gears 42 and 44 can be considered second gears and the output gears 51, 52, 53 and 54 be considered third gears. The synchronous engagement mechanisms 61, 62, 63 and 64 are configured and arranged to selectively lock the output gears 51, 52, 53 and 54, respectively, to the countershaft 35, by the shift actuator 28 that is controlled by the transmission control unit 16, as explained below. The shift actuator together with the synchronous gear engagement mechanisms 61, 62, 63 and 64 form a gear engagement device.

Thus, the automatic clutch 31 is configured and arranged to selectively engage (connect and disconnect) odd numbered gear shift ratios or ranges (first speed and third speed) by connecting the crankshaft 13 to the first input shaft 33 of the twin clutch transmission 11. The automatic clutch 32 is configured and arranged to selectively engage (connect and disconnect) even numbered gear shift ratios or ranges (second speed and fourth speed) by connecting the crankshaft 13 to the second input shaft 34.

The second input shaft 34 is a hollow shaft that is supported on the first input shaft 33. In particular, the first input shaft 33 inside the second input shaft 34 such that they are coaxially rotatable with respect to each other.

The countershaft 35 is rotatably provided in parallel with the first input shaft 33 and the second input shaft 34. A rear end of the countershaft 35 remote away from the engine 12 is connected drivingly with the differential gear system 14 (FIG. 1). The differential gear system 14 is drivingly connected with the right and left driving wheels 15.

The first input shaft 33 extends from the rear end of the second input shaft 34 in a remote direction away from the engine 12. The gear sets G1 and G3 for the odd numbered gear shift range group (the first speed and the third speed) are mounted between the extended rear end part of the first input shaft 33 and the countershaft 35, thus providing a first drive transmission path. In the first drive transmission path, one of the first and third speed gear sets is selected, which is related to a target gear shift range to output a target engine rotational speed from the countershaft 35, thus providing torque transmission as described later.

The first speed gear set G1 is arranged to be provided by the first speed input gear 41 formed integrally (non-rotatably) on an outer periphery of the first input shaft 33 and the first speed output gear 51 rotatably mounted on the countershaft 35, with the first speed input gear 41 and the first speed output gear 51 engaged with each other. The first speed input gear 41 and the first speed output gear 51 are all the time engaged regardless of presence or absence of the torque transmission from the engine 12.

The third speed gear set G3 is arranged to be provided with the third speed input gear 43 formed integrally (non-rotatably) on an outer periphery of the first input shaft 33 and the second speed output gear 53 rotatably mounted on the countershaft 35, with the third speed input gear 43 and the second speed output gear 53 engaged with each other. The third speed input gear 43 and the second speed output gear 53 are all the time engaged regardless of presence or absence of the torque transmission from the engine 12.

The gear sets G2 and G4 for the even numbered gear shift range group (the second speed and the fourth speed) are mounted between the second input shaft 34 and the countershaft 35, thus providing a second drive transmission path. In the second drive transmission path, one of the second and fourth speed gear sets is selected, which is related to a target gear shift range to output an engine rotational speed from the countershaft 35, thus providing torque transmission as described later.

The second speed gear set G2 is arranged to be provided with the second speed input gear 42 formed integrally (non-rotatably) on an outer periphery of the second input shaft 34 and the second speed output gear 52 rotatably mounted on the countershaft 35, with the second speed input gear 42 and the second speed output gear 52 engaged with each other. The second speed input gear 42 and the second speed output gear 52 are all the time engaged regardless of presence or absence of the torque transmission from the engine 12.

The fourth speed gear set G4 is arranged to be provided with the fourth speed input gear 44 formed integrally (non-rotatably) on an outer periphery of the second input shaft 34 and the fourth speed output gear 54 rotatably mounted on the countershaft 35, with the fourth speed input gear 44 and the fourth speed output gear 54 engaged with each other. The fourth speed input gear 44 and the fourth speed output gear 54 are all the time engaged regardless of presence or absence of the torque transmission from the engine 12.

The transmission control unit 16 is configured to control the clutch actuator 27 and the shift actuator 28 to perform a gear shift operation. In the gear shift control for the twin clutch transmission 11, as explained with a time chart shown in FIG. 3, first, one of the clutches 31 and 32 and one of the synchronous gear engagement mechanisms 61, 62, 63 and 64 are engaged to transmit the torque from the engine 12 using a selected current gear shift range or ratio, while the other one of the clutches 31 and 32 does not transmit the torque from the engine 12. Second, the gear set for a target gear shift range is selected from groups of the gear shift ranges or ratios related to the input shaft 33 or 34 connected to the other one of the clutches 31 and 32. Finally, the other one of the clutches 31 and 32 is slip engaged during a period of time between time t1 and t2, while at the same time the switching gear shift (i.e., operation of one of the synchronous gear engagement mechanisms 61, 62, 63 and 64) for engaging the other one of the clutches 31 and 32 is performed, whereby the gearshift operation is completed. Accordingly, the torque transmission from the engine can be continuously outputted without a torque transmission cutting between before and after the gearshift, and thus preventing the event that the torque transmission from the engine becomes "0" during the gearshift operation. Selecting the gear set for the target gear shift range or ratio in advance before time t1 when the switching gear shift is performed will hereinafter be referred to as a pre-shift.

Now, the slapping sound of gears that occur during shifting will be generally explained with reference to FIGS. 14 and 15. The slapping sound of the gears is a noise that is generated by collisions of an engagement face of a gear tooth formed in a driving gear to an engagement face of a gear tooth formed in an idle gear caused by a rotational fluctuation in the driving gear, at an engagement part for torque transmission between the driving gear in a driving state and the idle gear in an idling state of transmitting no torque. The level of the noise is proportional to a fluctuation amount of the rotational fluctuation in the driving gear, inertia of the idle gear or a backlash between the mutually engaged gear teeth. A noise is possibly generated even in a typical clutch transmission provided with a single clutch and a single input shaft.

Figure 14:
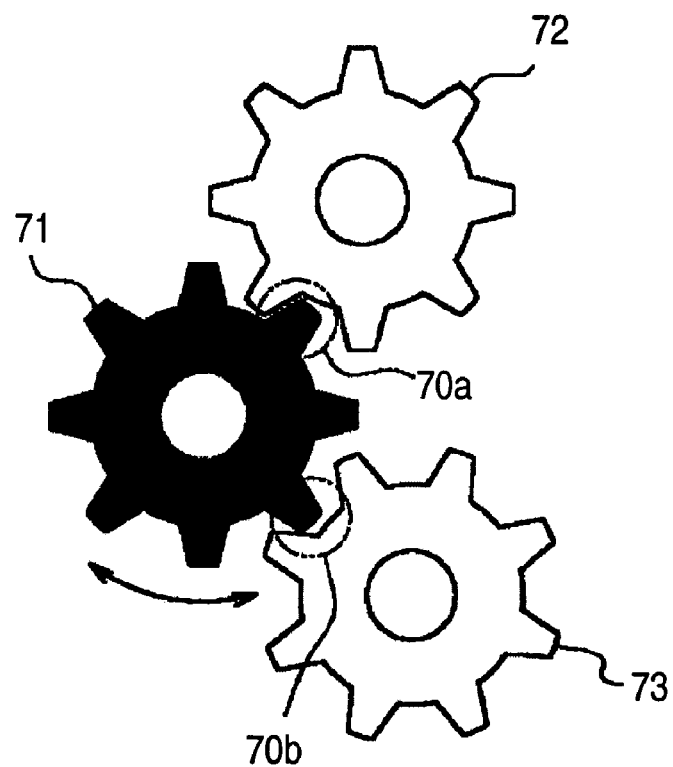
FIG. 14 is simplified diagrammatic view of the gears of the twin clutch transmission showing a noise level of a slapping sound of gears generated in a gear mechanism having a parallel engagement.

For instance, in a gear mechanism as shown in FIG. 14, a slapping sound of the gears is generated in an engagement part 70a between a driving gear 71 and an idle gear 72, as well as a slapping sound of the gears is generated in an engagement part 70b between the driving gear 71 and an idle gear 73. The respective slapping sounds of the gears in both the engagement parts 70a and the 70b are quantitatively equal in a noise level, since the inertia or the backlash of both the idle gears 71 and 73 is equal. Consequently, it is possible to show the engagement parts 70a and the 70b in circles of the same size with chain double-dashed lines as shown in FIG. 14.

Moreover, the slapping sound of the gears is generated even between the idle gears. For instance, in a gear mechanism as shown in FIG. 15, a slapping sound of the gears is generated in an engagement part 80a between a driving gear 81 and a neighboring idle gear 82, and a slapping sound of the gears is generated in an engagement part 80b between the idle gear 82 rotated together with the driving gear 81 and an end idle gear 83. The backlash is increased in the engagement part 80b via the idle gear 82, and the slapping sound of the gears in the engagement part 80b becomes at a higher noise level than the slapping sound of the gears in the engagement part 80a, and the engagement part 80b is possibly shown in a bigger circle with chain double-dashed lines as shown in FIG. 14.

Figure 15:
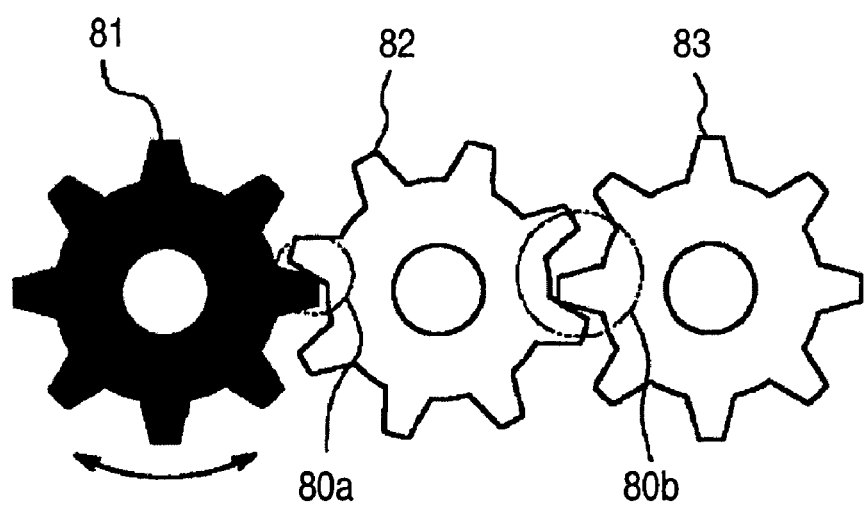
FIG. 15 is simplified diagrammatic view of the gears of the twin clutch transmission showing a noise level of the slapping sound of gears generated in a gear mechanism having a serial engagement.

As mentioned above, the slapping sound of the gears in the serial engagement as shown in FIG. 15 is greater than the slapping sound of the gears in the parallel engagement as shown in FIG. 14.

Figure 16:
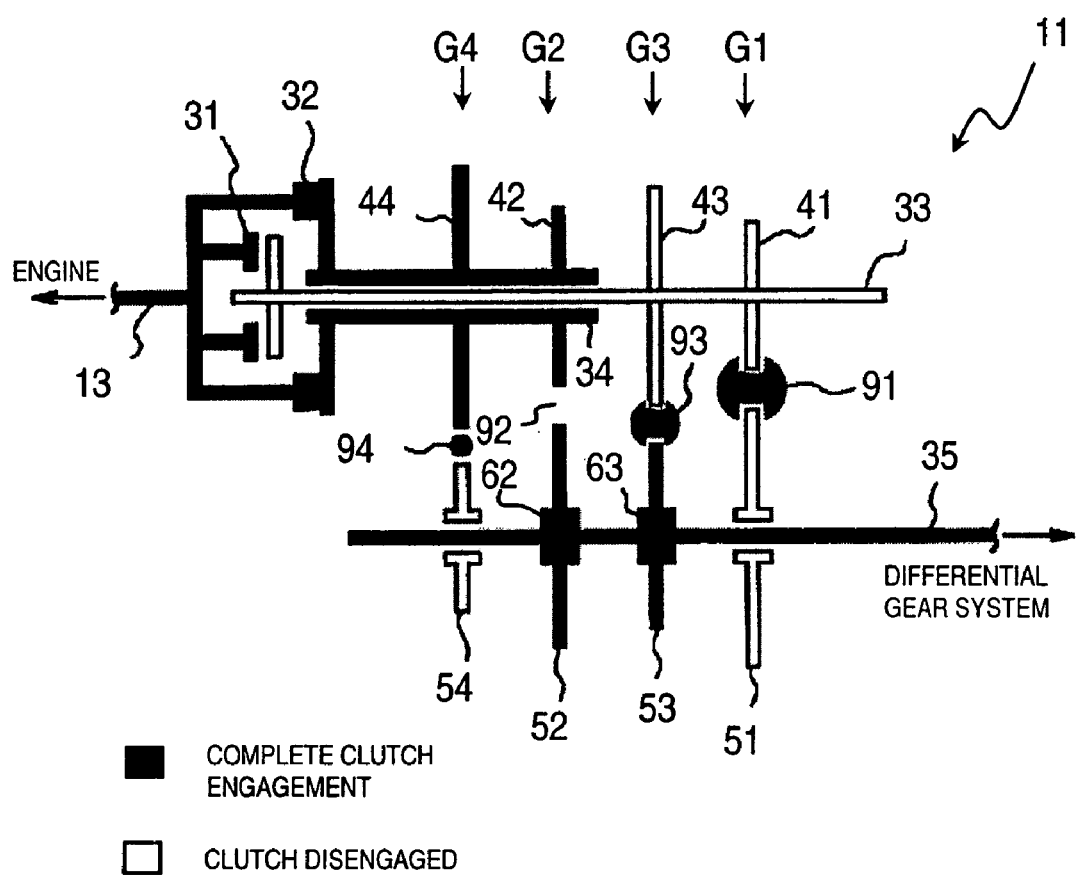
FIG. 16 is a simplified schematic view of the twin clutch transmission showing a clutch engagement state and a noise level of the slapping sound of gears during a conventional gear shift control.

Now the noise level for the slapping sound of the gears will be explained with reference to the simplified schematic view of the twin clutch transmission 11 as shown in FIG. 16. The engagement between the first input gear 41 and the first output gear 51 is indicated as an engagement part 91 (i.e., an engagement face of a gear tooth formed in the input gear engaging an engagement face of a gear tooth formed in the output gear). The engagement between the second input gear 42 and the second output gear 52 is indicated as an engagement part 92 (i.e., an engagement face of a gear tooth formed in the input gear engaging an engagement face of a gear tooth formed in the output gear). The engagement between the third input gear 43 and the third output gear 53 is indicated as an engagement part 93 (i.e., an engagement face of a gear tooth formed in the input gear engaging an engagement face of a gear tooth formed in the output gear). The engagement between the fourth input gear 44 and the fourth output gear 54 is indicated as an engagement part 94 (i.e., an engagement face of a gear tooth formed in the input gear engaging an engagement face of a gear tooth formed in the output gear). The level of the slapping noise in the engagement parts 91 to 94 will be indicated by the size of a black circle with no black circle being used when the level of the slapping noise is minimal or absent.

As shown in FIG. 16, a shift is being made from the second speed gear set G2 (i.e., the second speed input gear 42 and the second output gear 52) to the third speed gear set G3 (i.e., the second speed output gear 43 and the second output gear 53). As mentioned above, the second speed input gear 42 is formed integrally (non-rotatably) on the second input shaft 34, while the second speed output gear 52 is rotatably mounted on the countershaft 35, with the gears 42 and 52 being always engaged regardless of presence or absence of the torque transmission. The third speed input gear 43 is formed integrally (non-rotatably) on the first input shaft 33, while the third speed output gear 53 rotatably mounted on the countershaft 35, with the gears 43 and 53 being always engaged regardless of presence or absence of the torque transmission. For instance, when a gearshift from the second speed to the third speed is to be made, the clutch 32 is in a state of transmitting the torque from the engine 12 through the second speed gear set G2, as shown, and the clutch 31 is in a state that does not transmit the torque from the engine 12 to the differential gear system 14. Thus, the input shaft 33 is set in an idle state to rotate freely. Next, the third speed gear set G3 for the target gear shift range is selected from the gear shift range group of the gear sets G1 and G3 on the first input shaft 33 in an idle state, and the countershaft 35 and the third speed output gear 53 are connected through the synchronous gear engagement mechanism 63.

At this time, a gear tooth of the input gear 43 is initially in an idle state and a gear tooth of the output gear 53 is initially in a driving state. Then the gear tooth of the input gear 43 and the gear tooth of the output gear 53 collided against each other. This collision results in a slapping sound of the gears being produced as indicated by the engagement part 93 between the input gear 43 and the output gear 53. The slapping sound of the gears in the engagement part 93 is shown by a medium size black circle in FIG. 16, since the inertia of the first input shaft 33, or the input gear 43 formed integrally (non-rotatably) with the first input shaft 33 is large. Hereby, in addition, the gear set G2 is arranged in the middle of the torque transmission path starting with the engine 12 and leading to the differential gear system 14, so that the slapping sound of the gears is not generated in the gear set G2.

Moreover, the slapping sound of gears is also generated in the engagement part 94 between the input gear 44 (in a driving state) formed integrally (non-rotatably) on the second input shaft 34, and the output gear 54 (in an idling state) rotatably mounted on the countershaft 35. The slapping sound of the gears is indicated by the engagement part 94 as a small black circle in FIG. 16, since the inertia of the output gear 54 is large, but smaller than the engagement part 93.

Furthermore, the slapping sound of the gears is also generated in an engagement part 91 between the input gear 41 (in an idle state of the intermediate gear) formed integrally (non-rotatably) on the first input shaft 33, and the output gear 51 (in an idle state of the gear in the end) rotatably mounted on the countershaft 35. The slapping sound of the gears in the engagement part 91 is approximately equal to the noise level in the slapping sound of the gears in the serial engagement part 80b as described-above, and is shown in a big black circle since the noise level is the largest.

Operations of the twin clutch transmission 11 in the above-described preferred embodiment will be explained as follows.

The transmission control unit 16 is operatively connected to the clutch actuator 27 to control the clutches 31 and 32 and the shift actuator 28 to control the synchronous gear engagement mechanisms 61, 62, 63 and 64 based on various input signals from the sensors 21 to 26 as well as other sensors as needed and/or desired. The clutch actuator 27 is operatively coupled to the first and second clutches 31 and 32 and the transmission control unit 16, and executes an engagement/disengagement control and a clutch changeover control of the first and second clutches 31 and 32 on a control command outputted from the transmission control unit 16. The shift actuator 28 is operatively coupled to the synchronous gear engagement mechanisms 61, 62, 63 and 64 and the transmission control unit 16, and controls an engagement/disengagement control of the output gears 51, 52, 53 and 54, respectively, on the basis of a control command outputted from the transmission control unit 16.

Although both the clutches 31 and 32 are engaged in a neutral range (N) and a parking range (P) that do not perform power transmission, since all of the output gears 51, 52, 53 and 54 are rotatably mounted on the countershaft 35 as shown in FIG. 1. In other words, the twin clutch transmission 11 does not perform the torque transmission because the synchronous gear engagement mechanisms 61, 62, 63 and 64 in an unlocked or disengaged state to allow the output gears 51, 52, 53 and 54 to freely rotate on the countershaft 35. However, the clutches 31 and 32 and the synchronous gear engagement mechanisms 61, 62, 63 and 64 are selectively controlled to always maintain an engine driving torque on the countershaft 35.

According to the arrangement of the present invention, a slip engagement is in advance made on one of the clutches 31 and 32, by which a slight-torque transmission path is formed in one of the input shafts 33 and 34 which has been idle at the conventional gear shift. As a result, generation of noises by collisions of gears in the engagement parts thereof on the torque transmission path can be prevented. Accordingly, at a switching gear shift operation according to the present invention, a decrease in the number of gears in an idle state allows reduction of a slapping sound of gears at the time of the gear shift operation, by which it is possible to contribute to an improvement of a comfortable ride performance by achieving a gear shift control without a torque cutting and decreasing the noise.

The output gears 51, 52, 53 and 54 corresponding to the selected gear shift ranges, as stated below, are connected to the countershaft 35. The other output gears (not shown), and the other reverse output gears (not show) are also connected to the countershaft 35 in a similar manner. In a driving (D) range that intends to perform the forward power transmission and a reverse (R) range that intends to perform the backward power transmission, each of the forward gear shift ranges or the reverse gear shift range is selected, thus performing the torque transmission.

Figure 4:
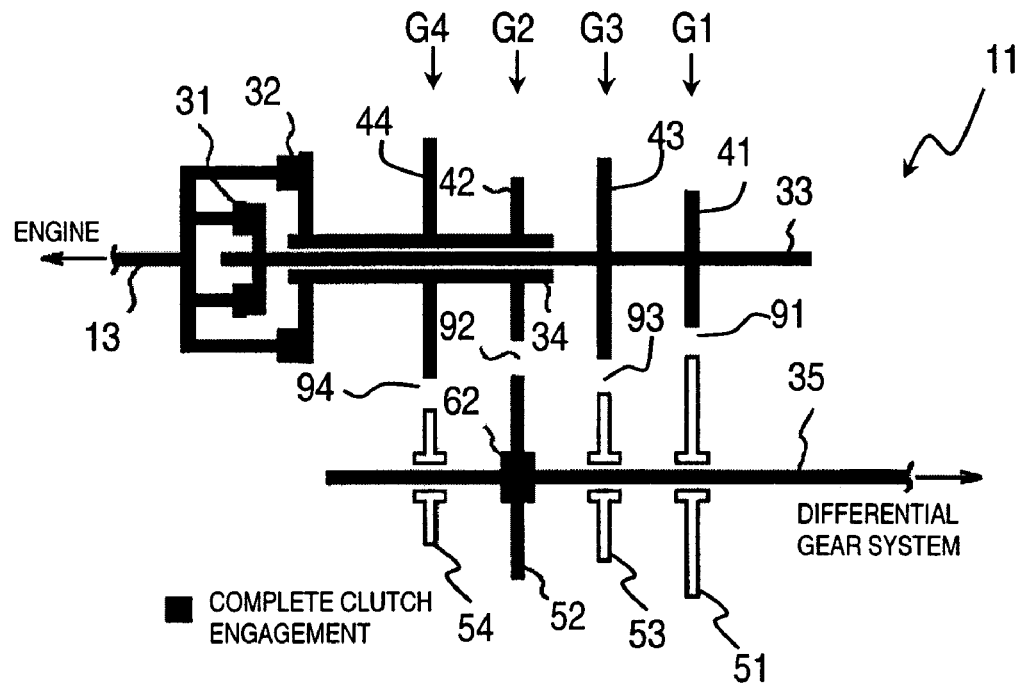
FIG. 4 is a simplified schematic view of the twin clutch transmission illustrated in FIG. 1 showing a clutch engagement state before performing a gear shift control.

For instance, when driven with the second speed selected in the D range, the clutches 31 and 32 both are completely engaged as shown in FIG. 4. However, only the second speed output gear 52 among the output gears 51, 52, 53 and 54 is connected to the countershaft 35 through the synchronous gear engagement mechanism 62. The torque from the engine 12, as shown in black in FIG. 4, is outputted into the differential gear system 14 from the crank shaft 13 sequentially via the completely engaged clutch 32, the second input shaft 34, the second speed gear set G2 (gears 42 and 52) and the countershaft 35, whereby the torque transmission at the second speed can be obtained. In addition, the slapping sound of the gears 42 and 52 is not generated in the engagement part 92 of the second speed gear set G2 in the torque transmission path, because the gears 42 and 52 are not in an idle state.

Figure 5:
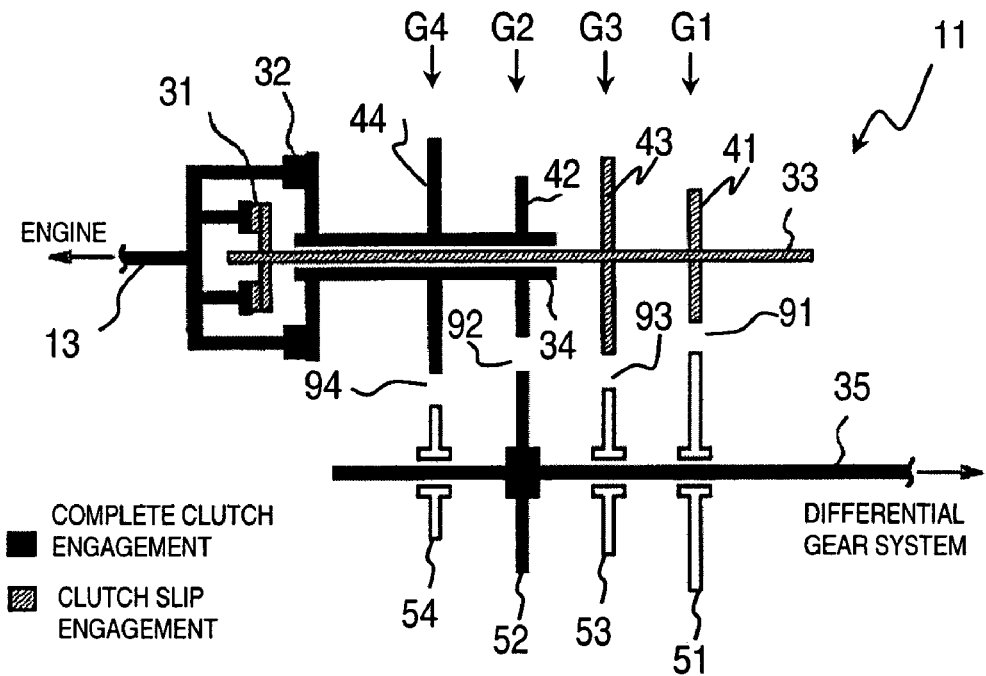
FIG. 5 is a simplified schematic view of the twin clutch transmission illustrated in FIG. 1 showing a clutch engagement state during performing a gear shift control.

When a gear shift operation is performed to carry out an up-shift operation from the second speed to the third speed, first, a slip engagement of the clutch 31 is made with the clutch 32 still completely engaged as shown in FIG. 5. Hereby, the first input shaft 33 is shown with diagonal lines in FIGS. 5 and 6, adapted to be in a slipping connection state that is an intermediate state between the driving state and the idling state.

Figure 6:
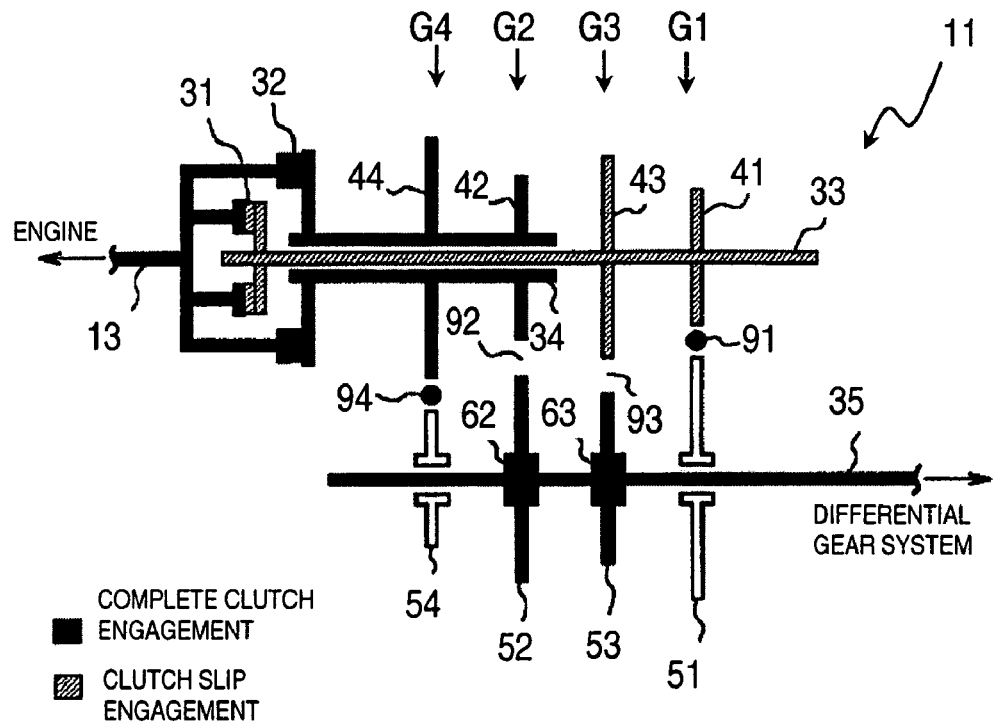
FIG. 6 is a simplified schematic view of the twin clutch transmission illustrated in FIG. 1 showing a clutch engagement state and a noise level of the slapping sound of gears during performing a gear shift control.

Secondly, as shown in FIG. 6, the third speed output gear 53 is connected to the countershaft 35 through the synchronous engagement mechanism 63, and a pre-shift is performed in advance for selecting a gear change gear shift range schedule as the next gear set. Thus, this causes formation of both a main torque transmission path and a sub torque transmission path to occur simultaneously. The main torque transmission path of the engine rotational force, as shown in black in FIG. 6, is transmitted from the crank shaft 13 via the clutch 32, the second input shaft 34, the second speed input gear 42, the second speed output gear 52 and the countershaft 35 to the differential gear system 14. The sub torque transmission path, as shown in diagonal lines in FIG. 6, is transmitted from the crank shaft 13 via the clutch 31, the first input shaft 33, the third speed input gear 43 and the third speed output gear 53 to the countershaft 35.

In addition, in order to prevent an inter-lock of the twin clutch transmission, each of the clutches 31 and 32 is controlled such that a clutch torque of the slip-engaged clutch 31 (the torque that the clutch 31 transmits to the input shaft 33) becomes sufficiently smaller than clutch torque of the completely engaged clutch 32 (the torque that the clutch 32 transmits to the input shaft 34).

Figure 7:
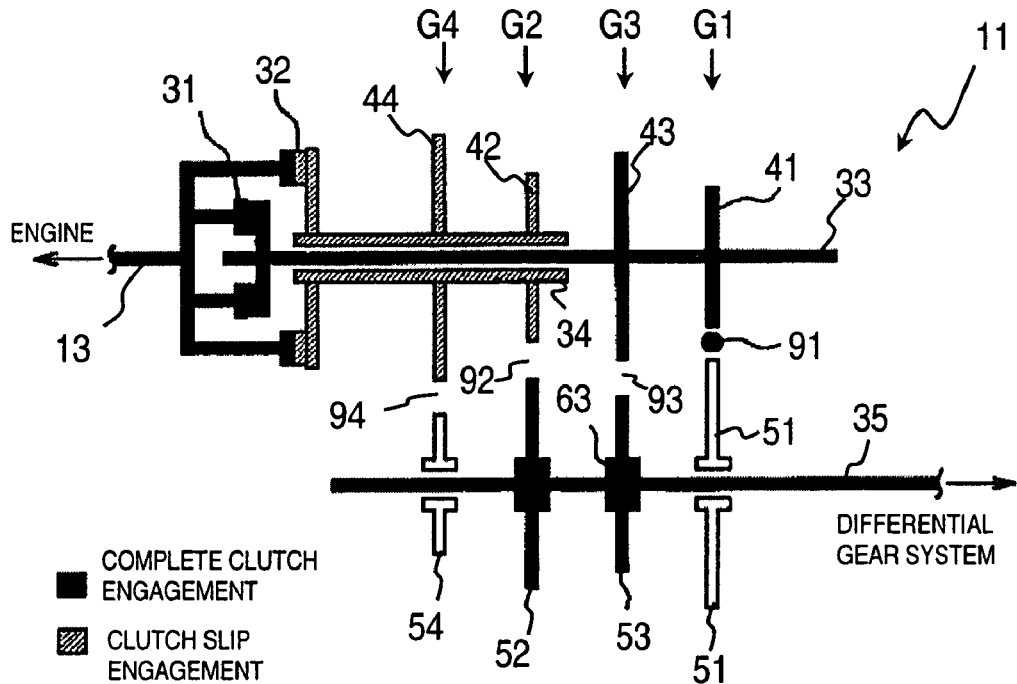
FIG. 7 is a simplified schematic view of the twin clutch transmission illustrated in FIG. 1 showing a clutch engagement state and a noise level of the slapping sound of gears during performing a gear shift control.

Next, a switch to the gear change stage is performed for completely engaging the clutch 31 related to the third speed gear shift range, while beginning disengagement of the clutch 32 related to the second speed gear shift range. As a result, the clutch 32 related to the second speed gear shift, as shown in FIG. 7, is slip-engaged, and the clutch 31 for the third speed gear shift is completely engaged. In addition, a slapping sound of the gears in the engagement part 91 of the first speed gear set G1 results, since the rotational fluctuation in the input gear 41 increases at this time.

Figure 8:
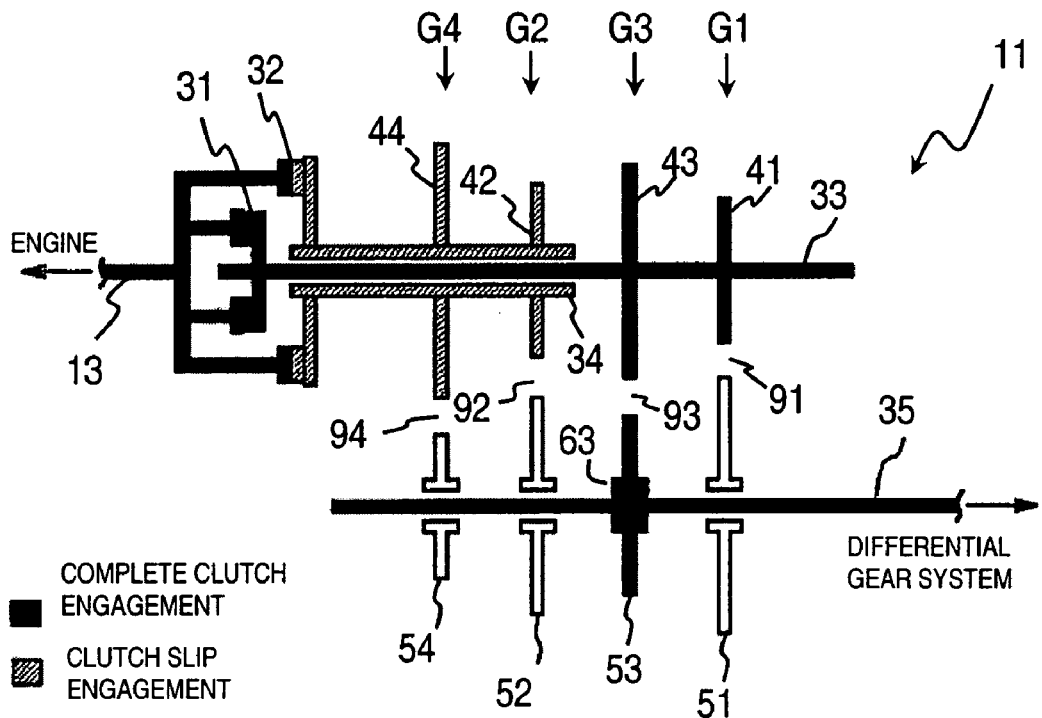
FIG. 8 is a simplified schematic view of the twin clutch transmission illustrated in FIG. 1 showing a clutch engagement state during performing a gear shift control.
Figure 9:
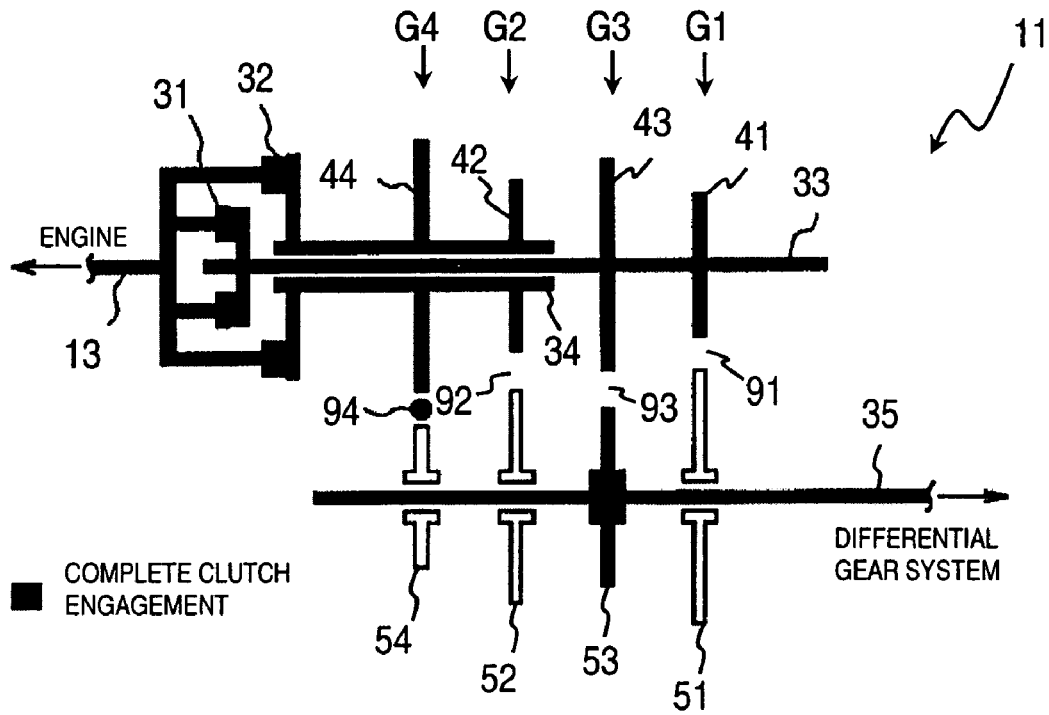
FIG. 9 is a simplified schematic view of the twin clutch transmission illustrated in FIG. 1 showing a clutch engagement state and a noise level of the slapping sound of gears after completing a gear shift control.

Next, as shown in FIG. 8, the output gear 52 of the second speed gear change stage is separated from the countershaft 35 so that the output gear 52 can rotate on the countershaft 35, i.e., the synchronous engagement mechanism 62 is disengaged. As shown in FIG. 9, the clutch 32 is then re-engaged to complete an up-shift operation to the third speed. A slapping sound of the gears in the engagement part 94 of the fourth speed gear set G4 occurs, since the rotational fluctuation in the input gear 44 increases at this time.

Now, as shown in black in FIG. 9, the engine rotation force from the engine 12 is outputted sequentially from the crank shaft 13 via the clutch 31, the input shaft 33, the third speed gear set G3, and the countershaft 35 to the differential gear system 14, thus performing the torque transmission at the third speed.

Figure 3:
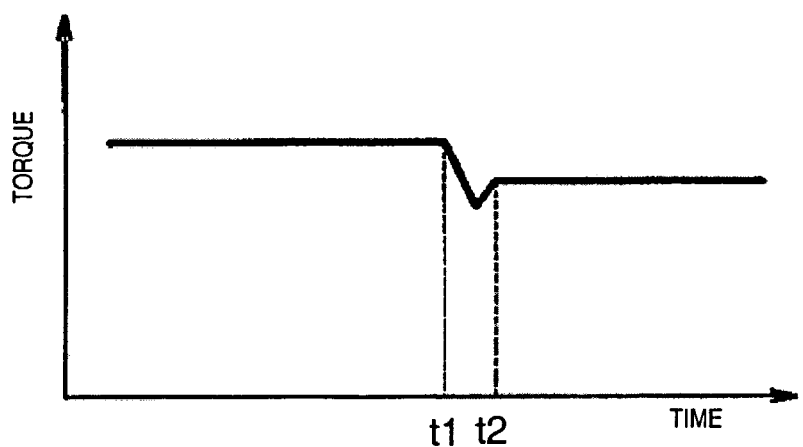
FIG. 3 is a time chart showing a torque transmission at the time of a gear shift control performed in the twin clutch transmission of FIG. 1.

As shown in FIG. 3, the time chart shows the torque fluctuation during a switching gear shift. More specifically, when an up-shift is to be made from the second speed gear set G2 to the third speed gear set G3, the third speed gear set G3 is engaged as shown in FIGS. 4 to 6, by first slip engagement of the clutch 31 and then connecting the output gear 53 to the countershaft 35 prior to time t1. Thus, a pre-shift is performed prior to time t1. Next, the switching of the clutches 31 and 32 is performed between time t1 and time t2, by which the engagement state of the clutches 31 and 32 is switched from the state in FIG. 6 to the state in FIG. 7. And, the second speed gear set G2 is disconnected from the countershaft 35 (FIG. 8) after time t2, by which the gearshift is completed (FIG. 9). Therefore, as shown in the time chart in FIG. 3 the torque transmission from the engine 12 can be continuously outputted without the completely cutting out between, before and after the up-shift operation, and the torque transmission from the engine 12 does not become "0" once during the gearshift operation.

Moreover, as for the gear shift operation, as shown with the diagonal lines in FIG. 6, not only the main torque transmission path goes through the second speed gear set G2, but also the sub torque transmission path is formed on the third speed gear set G3 during the pre-shift operation, whereby the generation of the slapping sound of the gears between the gears 43 and 53 of the third speed gear set G3 can be prevented.

In addition, although the torque transmission path is not formed in each of the engagement parts 91 to 94 between the output gears 51 and 54 in an idle state, and the input gears 41 and 44, and the slapping sound of the gears is generated in the engagement parts 91 and 94, the inertia of the output gears 51 and 54 is small. Thus, the noise level of the slapping sound of the gears in the engagement parts 91 and 94 is shown in small black circles in FIG. 6, and thus the noise level can be totally reduced.

Consequently, when the noise level for the slapping sound of the gears in the twin clutch transmission 11 shown operated in the manner of FIG. 16 is compared with the noise level according to the switching gear change of the preferred embodiment, the noise level in the preferred embodiment can be plainly reduced.

Besides the above-described, even at the other up-shift operations, such as the up-shift from the third speed to the fourth speed, the clutches 31 and 32 are completely engaged and slip-engaged alternately, by which the switching gear shift is also performed as well as the above-described.

In addition, even when the down-shift from the top speed to the first speed is performed, the switching gear shift opposite to that of the above up-shift is performed, thereby performing a predetermined down-shift.

Figure 10:
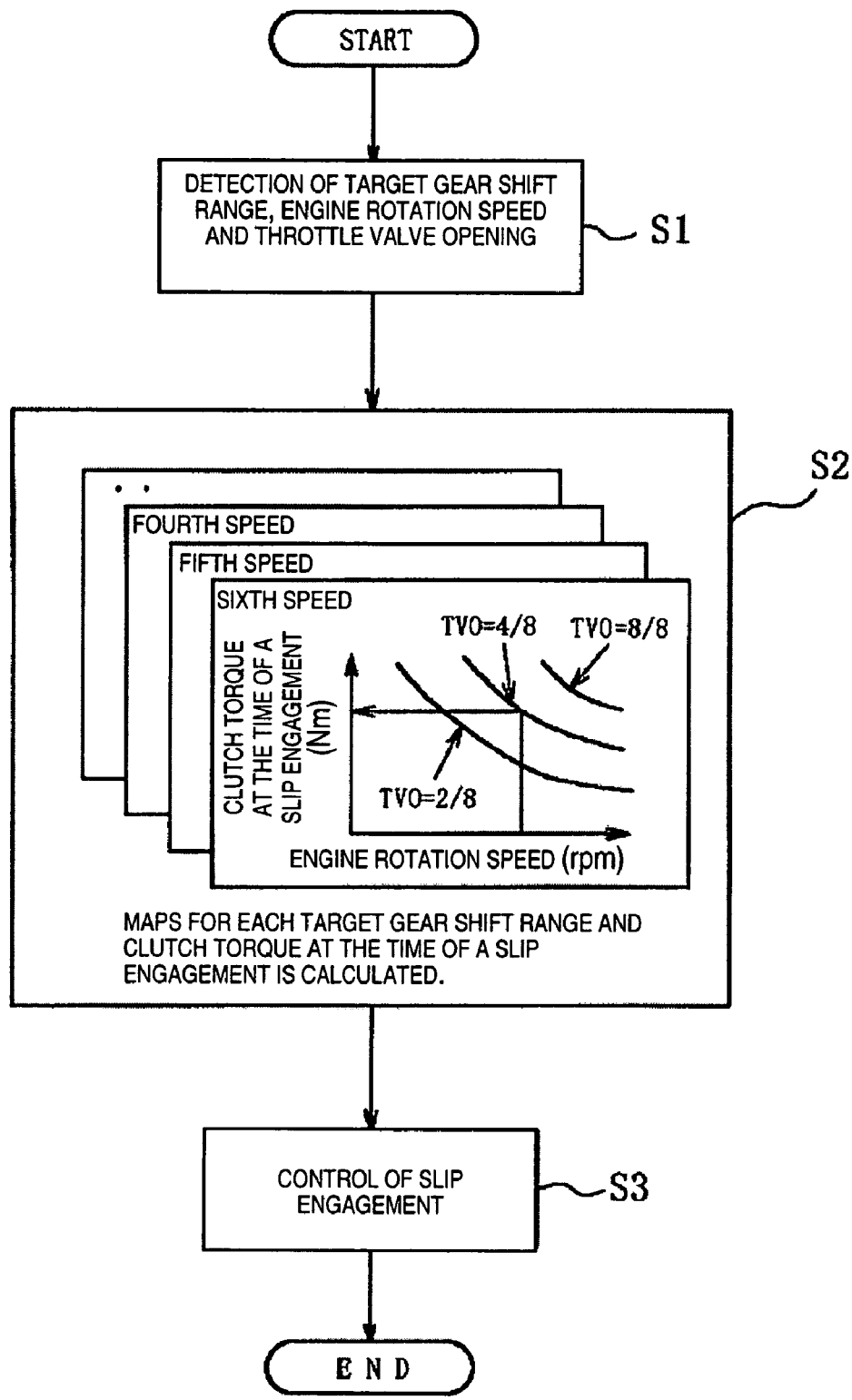
FIG. 10 is a flow chart showing a control program executed by the transmission control system to perform a slip engagement of one of the clutches of the twin clutch transmission illustrated in FIGS. 1-9.

Next, a clutch torque control by which the clutches 31 and 32 transmit the engine rotation force during the slip-engagement operation with regard to the switching gear shift will be described. When the D range is selected as a shift position, a clutch torque control section of the transmission control unit 16 that performs the gear shift control carries out a control program as shown in FIG. 10, thus automatically performing the gear shift operation.

First, in Step S1, the clutch torque control section is configured to determine whether an up-shift operation or a down-shift operation is being performed. Then, a target gear shift range or ratio, the engine speed rpm and an opening TVO of a throttle valve of the engine are detected using sensors 21 to 26 in a conventional manner. The detected values are stored in the memory of the transmission control unit 16 for use by the clutch torque control section.

Figure 13:
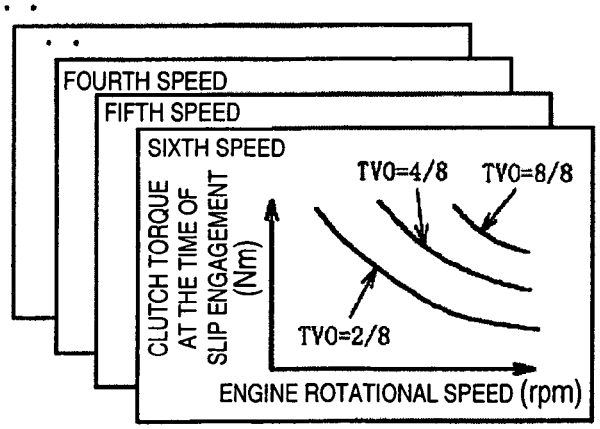
FIG. 13 is a characteristic map showing a relation between engine rotational speeds and clutch torque at a slip-engagement operation for each gear shift for each gear shift range or ratio that is utilized by the transmission control system.

The clutch torque control section is configured to store a clutch torque-calculating map for the clutch torque for each target gear shift range at the time of the slip-engagement operation as shown in FIG. 13 to be described later.

In Step S2, the clutch torque control section is configured to refer to the clutch torque-calculating map of the clutch torque at the time of the slip-engagement operation in accordance with the target gear shift range to calculate the clutch torque at the time of the slip-engagement operation based upon the above detected values.

In Step S3, assuming the calculated clutch torque at the time of the slip-engagement operation as a target value, the slip-engagement for the clutches 31 and 32 at the time of the switching gear shift control is controlled by the clutch torque control section. In particular, when hydraulic clutches are used, a hydraulic pressure is variably controlled by the clutch torque control section for performing engagement and disengagement thereof.

Figure 11:
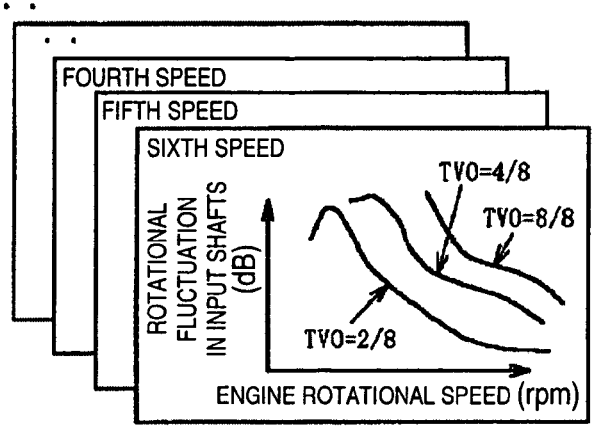
FIG. 11 is a characteristic map showing a relation between engine rotational speeds and rotational fluctuations of input shafts for each gear shift range or ratio that is utilized by the transmission control system.

By experimentation or a simulation, the clutch torque-calculating map of the clutch torque at the time of the slip-engagement operation is determined in advance. As a procedure of a method of determining the clutch torque-calculating map, first, as shown in FIG. 11, relationships between engine rotational speed (rpm) and rotational fluctuation (dB) in the input shafts 33 and 34 are obtained for each gear shift range or ratio, based upon setting the throttle valve opening TVO of the throttle valve as a parameter. In addition, the six speeds are representatively shown in FIG. 11.

Figure 12:
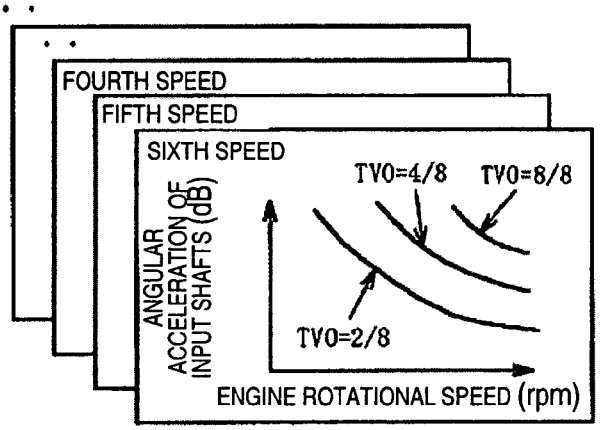
FIG. 12 is a characteristic map showing a relation between engine rotational speeds and angular acceleration of rotational fluctuations of input shafts for each gear shift range or ratio that is utilized by the transmission control system.

Next, as shown in FIG. 12, the rotational fluctuation (dB) in each of the input shafts 33 and 34 is converted into angular acceleration (dB). In addition, the six speeds are representatively shown in FIG. 12.

Next, a total inertia value of the input shafts and the gears (rotational elements) that are in an idle state and require prevention of the slapping sound of gears is obtained for each gear shift range. To obtain the total inertia value of the input shafts and the gears, the inertia for each of the rotational elements is first respectively obtained. Next, each of the inertia is converted into values on the input shafts 33 and 34, based upon taking into account a gear ratio for each of the rotational elements, and these converted values are added.

A relationship between the torque To, the angular acceleration $(d^2\theta/dt^2)$ and the inertia IP is shown in the following formula.

$$To = d^2\theta/dt^2 \times Ip \qquad (1)$$

Based upon the above formula (1), the angular acceleration (dB) shown in FIG. 12 is multiplied by the above inertia value for each gear shift range, and the clutch torque at the time of the slip-engagement operation that the clutches 31 and 32 in the slip-engagement operation transmit is calculated, and the calculated clutch torque is mapped for each gear shift range. The maps of the clutch torque at the time of the slip-engagement operation are shown in FIG. 13, representative of the six speeds.

In addition, the clutch torque at the time of the slip-engagement operation is required to be a value sufficient for prevention of the slapping sound of gears in the engagement parts on the torque transmission path, and is required to be a minimal value, being compared with the torque that is transmitted during a period of time between time t1 and t2 (the torque of the main torque transmission path) in the time chart of the switching gear shift shown in FIG. 3, which prevents the inter-lock phenomena.

Meanwhile, according to the driving force transmission apparatus of the preferred embodiment as described above, in the event of the switching gear shift of the gear shift ranges, when the torque transmission is performed via the second speed gear set G2 provided in the one drive transmission path as described above, the output gear 53 of the third speed gear set G3 scheduled to be selected next is arranged to be connected to the countershaft 35 in a state where the other drive transmission path and the engine 12 are disconnected by the automatic clutch 31 for the odd numbered gear shift ranges. And, the automatic clutch 32 for the even numbered gear shift ranges that is transmitting the driving force is disengaged at the time of the switching gear change for the gear shift ranges, by which the gearshift operation that connects with the automatic clutch 31 for the odd numbered gear shift ranges is performed.

In the event of the switching gear shift operation, in a case of the predetermined operation condition, which is an up-shift operation or a down-shift operation in the preferred embodiment, a slip-engagement section is provided in the transmission control unit 16 so that, even prior to the switching of the gear shift range, the output gear 53 of the third gear set G3 is engaged to the shaft 35, while the clutch 31 is slip-engaged. Thus, the clutch 31 is slip-engaged in advance of a gear shift such that the drive transmission path remains connected by the clutch 31 (refer to FIG. 6).

As a result, as shown in FIG. 6, the main torque transmission path goes through the second speed gear set G2, as well as the sub torque transmission path goes through the third speed gear set G3, so that the slapping sound of the gears in the engagement parts 92 and 93 of the gear sets G2 and G3 can be prevented (no black circle). Moreover, the first input shaft 33 does not become idle, thereby the slapping sound of the gears in the engagement part 91 of the gear set G1 can be reduced (a small black circle). Consequently, according to the driving force transmission apparatus of the present invention, even in an up-shift operation and a down-shift operation for each target gear shift range or ratio, the number of the gears in an idle state is decreased to reduce the slapping sound of the gears at the time of the switching gear shift, so that the noises can be reduced. Also the gear shift control without torque cutting out, which is the feature of the gear shift control for the twin clutch transmission, can be performed, thereby contributing to an improvement of the comfortable ride performance.

Furthermore, according to the driving force transmission apparatus of the preferred embodiment, based upon the inertia of the first input shaft 33 related to the automatic clutch 31 for the odd numbered gear shift ranges and the gear sets G1 and G3 related to the first input shaft 33 during the slip-engagement operation as shown in FIG. 6, the engine rotational speed (rpm), and the throttle valve opening TVO of the throttle valve, the clutch torque at the time of the slip-engagement operation is calculated by referring to the torque-calculating map for the torque at the slip-engagement operation shown in FIG. 13. Thereby, the driving force transmission apparatus of the preferred embodiment controls the engagement torque of the clutch 31 for the slip engagement. As a result, the sub torque transmission path can be formed by use of the torque sufficient for the prevention of the slapping sound of the gears, thus preventing the inter-lock.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A driving force transmission apparatus comprising:
   a first input shaft having a plurality of first gears;
   a second input shaft having a plurality of second gears;
   a first clutch configured and arranged to operatively transmit an engine driving force of an engine to the first input shaft;
   a second clutch configured and arranged to operatively transmit the engine driving force of the engine to the second input shaft;
   a countershaft having a plurality of third gears with the countershaft being disposed in parallel with the first and second input shafts such that the third gears are engaged with the first and second gears to selectively transmit the engine driving force from the first and second input shafts to the countershaft through first and second gear sets, the first gear sets being established by connection of one of the first and third gears together, the second gear sets being established by connection of one of the second and third gears together, one of the first, second and third gears in each of the first and second gear sets being rotatably mounted on a corresponding one of the first and second input shafts and the countershaft, and one of the first, second and third gears in each of the first and second gear sets being non-rotatably mounted on a corresponding one of the first and second input shafts and the countershaft;

a gear engagement device configured and arranged to selectively fix of one of the first, second and third gears that are rotatably mounted to the corresponding one of the first and second input shafts and the countershaft; and a transmission control unit configured to selectively operate the first and second clutches and the gear engagement device when a predetermined engine operating condition is determined to selectively establish one of
   a first drive transmission path transmitting the engine driving force from the first clutch via the first input shaft through one of the first gear sets and the countershaft to a driving wheel, and
   a second drive transmission path transmitting the engine driving force from the second clutch via the second input shaft through the one of the second gear sets and the countershaft to the driving wheel; and
the transmission control unit being further configured to perform a gear shift operation that switches from a current drive transmission path of one of the first and second drive transmission paths to a next drive transmission path of one of the first and second drive transmission paths such that one of each of the first and second gear sets are both engaged for a period of time prior to the gear shift operation with a slip engagement occurring in the one of the first and second clutches that is disposed in the next drive transmission path prior to the period of time in which one of each of the first and second gear sets are engaged.

2. The driving force transmission apparatus according to claim 1, wherein
the first input shaft is disposed coaxially within an interior bore of the second input shaft with the first input shaft being located partly inside of the second input shaft and extending in a direction opposite to the engine from the second input shaft.

3. The driving force transmission apparatus according to claim 1, wherein
the first and second gears are fixed on the first and second input shafts, respectively, and the third gears are mounted on the countershaft to be selectively rotatable.

4. The driving force transmission apparatus according to claim 1, wherein
the transmission control unit is further configured to perform the slip engagement of the one of the first and second clutches that is disposed in the current drive transmission path after the one of the first and second clutches that is disposed in the next drive transmission path is fully engaged.

5. The driving force transmission apparatus according to claim 4, wherein
the transmission control unit is further configured to fully engage both of the first and second clutches after the gear engagement device completely disconnects the current drive transmission path.

6. A driving force transmission apparatus comprising:
a first input shaft having a plurality of first gears;
a second input shaft having a plurality of second gears;
a first clutch configured and arranged to operatively transmit an engine driving force of an engine to the first input shaft;
a second clutch configured and arranged to operatively transmit the engine driving force of the engine to the second input shaft;
a countershaft having a plurality of third gears with the countershaft being disposed in parallel with the first and second input shafts such that the third gears are engaged with the first and second gears to selectively transmit the engine driving force from the first and second input shafts to the countershaft through first and second gear sets, the first gear sets being established by connection of one of the first and third gears together, the second gear sets being established by connection of one of the second and third gears together, one of the first, second and third gears in each of the first and second gear sets being rotatably mounted on a corresponding one of the first and second input shafts and the countershaft, and one of the first, second and third gears in each of the first and second gear sets being non-rotatably mounted on a corresponding one of the first and second input shafts and the countershaft;

a gear engagement device configured and arranged to selectively fix of one of the first, second and third gears that are rotatably mounted to the corresponding one of the first and second input shafts and the countershaft; and a transmission control unit configured to selectively operate the first and second clutches and the gear engagement device when a predetermined engine operating condition is determined to selectively establish one of
   a first drive transmission path transmitting the engine driving force from the first clutch via the first input shaft through one of the first gear sets and the countershaft to a driving wheel, and
   a second drive transmission path transmitting the engine driving force from the second clutch via the second input shaft through the one of the second gear sets and the countershaft to the driving wheel; and
the transmission control unit being further configured to perform a gear shift operation that switches from a current drive transmission path of one of the first and second drive transmission paths to a next drive transmission oath of one of the first and second drive transmission paths such that one of each of the first and second gear sets are both engaged for a period of time prior to the gear shift operation with a slip engagement occurring in the one of the first and second clutches that is disposed in the next drive transmission path during the period of time in which one of each of the first and second gear sets are engaged, the transmission control unit being further configured to perform the slip engagement such that a clutch torque of the one of the first and second clutches, which is being slip engaged prior to the gear shift operation, is controlled based upon a detected engine rotational speed and a detected throttle valve opening.

7. A driving force transmission apparatus comprising:
first input means for establishing a plurality of first gears;
second input means for establishing a plurality of second gears;
first clutch means for operatively connecting and disconnecting an engine driving force of an engine to the first input means;
second clutch means for operatively connecting and disconnecting the engine driving force of the engine to the second input means;
output means for establishing a plurality of third gears engaged with the first and second gears to selectively transmit the engine driving force from the first and second input means to the output means through first and second gear sets, the first gear sets being established by connection of one of the first and third gears together, the second gear sets established by connection of one of the second and third gears together, one of the first, second and third gears in each of the first and second gear sets being rotatably mounted on a corresponding one of the first and second input means and the output means, and one of the first, second and third gears in each of the first and second gear sets being non-rotatably mounted on a corresponding one of the first and second input means and the output means;

gear engagement means for selectively fixing of one of the first, second and third gears that are rotatably mounted to the corresponding one of the first and second input means and the output means; and transmission control means for selectively controlling the first and second clutch means and the gear engagement means when a predetermined engine operating condition is determined to selectively establish one of
- a first drive transmission path transmitting the engine driving force from the first clutch means via the first input means through one of the first gear sets and the output means to a driving wheel, and
- a second drive transmission path transmitting the engine driving force from the second clutch means via the second input means through the one of the second gear sets and the output means to the driving wheel; and the transmission control means being further configured to perform a gear shift operation that switches from a current drive transmission path of one of the first and second drive transmission paths to a next drive transmission path of one of the first and second drive transmission paths such that one of each of the first and second gear sets are both engaged for a period of time prior to the gear shift operation with a slip engagement occurring in the one of the first and second clutch means that is disposed in the next drive transmission path prior to the period of time in which one of each of the first and second gear sets are engaged.

8. A method of shifting a driving force transmission apparatus comprising:

selectively establishing one of a first drive transmission path and a second drive transmission path where the first drive transmission path transmits an engine driving force from a first clutch via one of a plurality of first gear sets formed on a first input shaft and a countershaft to a driving wheel, and where the second drive transmission path transmits the engine driving force from a second clutch via one of a plurality of second gear sets formed on a second input shaft and the countershaft to the driving wheel; and selectively performing a gear shift operation that switches from a current drive transmission path of one of the first and second drive transmission paths to a next drive transmission path of one of the first and second drive transmission paths such that one of each of the first and second gear sets are both engaged for a period of time prior to the gear shift operation with a slip engagement occurring in the one of the first and second clutches that is disposed in the next drive transmission path prior to the period of time in which one of each of the first and second gear sets are engaged.

9. The method according to claim 8, wherein the first and second drive transmission paths are formed by first and second gears are fixed on the first and second input shafts, respectively, and third gears are mounted on the countershaft to be selectively rotatable.

10. The method according to claim 8, further comprising performing the slip engagement of the one of the first and second clutches that is disposed in the current drive transmission path after the one of the first and second clutches that is disposed in the next drive transmission path is fully engaged.

11. The method according to claim 10, further comprising fully engaging the one of the first and second clutches that is disposed in the current drive transmission path after the one of the first and second clutches that is disposed in the next drive transmission path is fully engaged and the current drive transmission path is completely disconnected.

12. A method of shifting a driving force transmission apparatus comprising:

selectively establishing one of a first drive transmission path and a second drive transmission path where the first drive transmission path transmits an engine driving force from a first clutch via one of a plurality of first gear sets formed on a first input shaft and a countershaft to a driving wheel, and where the second drive transmission path transmits the engine driving force from a second clutch via one of a plurality of second gear sets formed on a second input shaft and the countershaft to the driving wheel; and selectively performing a gear shift operation that switches from a current drive transmission path of one of the first and second drive transmission paths to a next drive transmission path of one of the first and second drive transmission paths such that one of each of the first and second gear sets are both engaged for a period of time prior to the gear shift operation with a slip engagement occurring in the one of the first and second clutches that is disposed in the next drive transmission path during the period of time in which one of each of the first and second gear sets are engaged, the slip engagement being performed such that a clutch torque of the one of the first and second clutches, which is being slip engaged prior to the gear shift operation, is controlled based upon a detected engine rotational speed and a detected throttle valve opening.

* * * * *